1,908,240

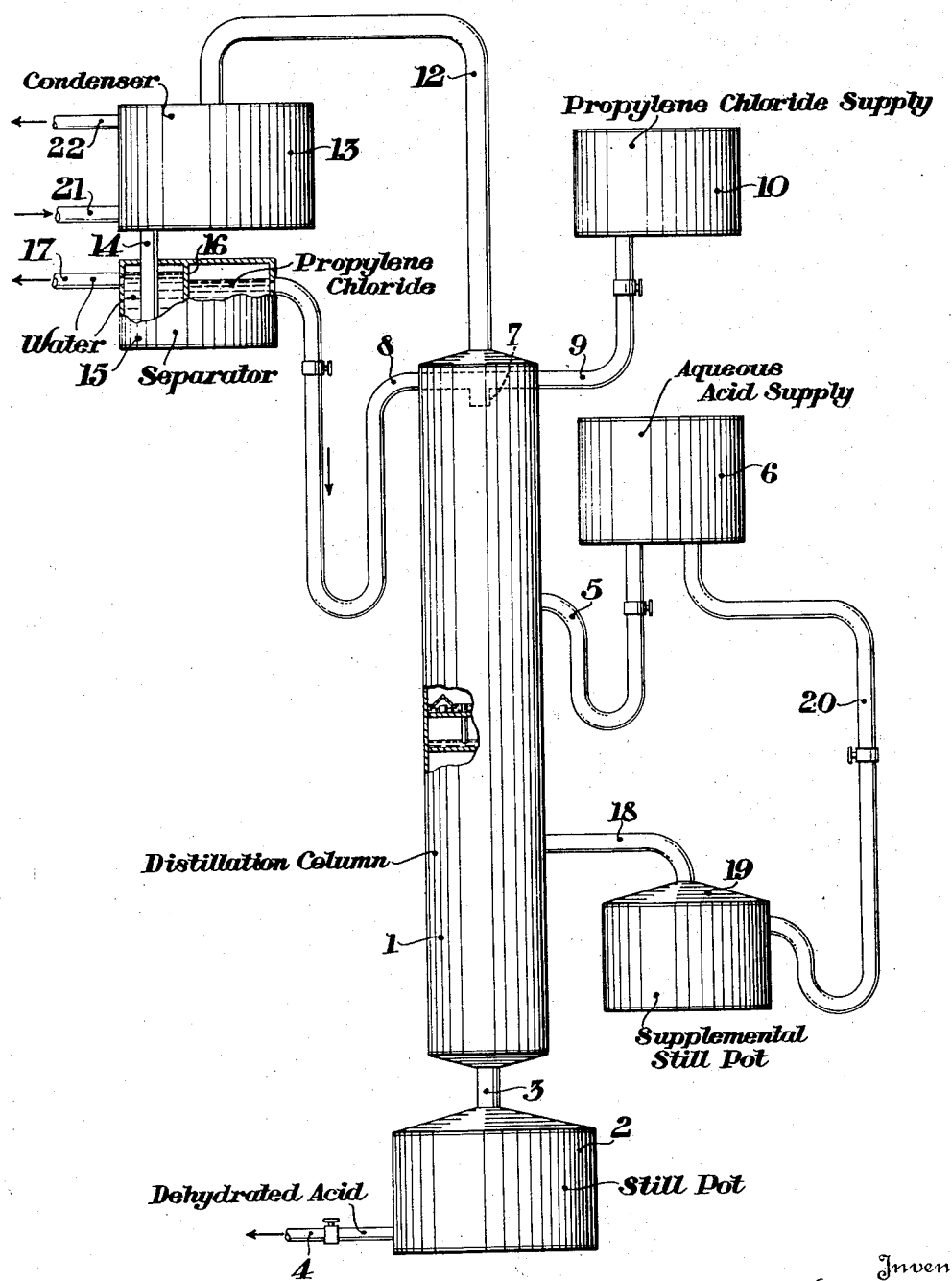

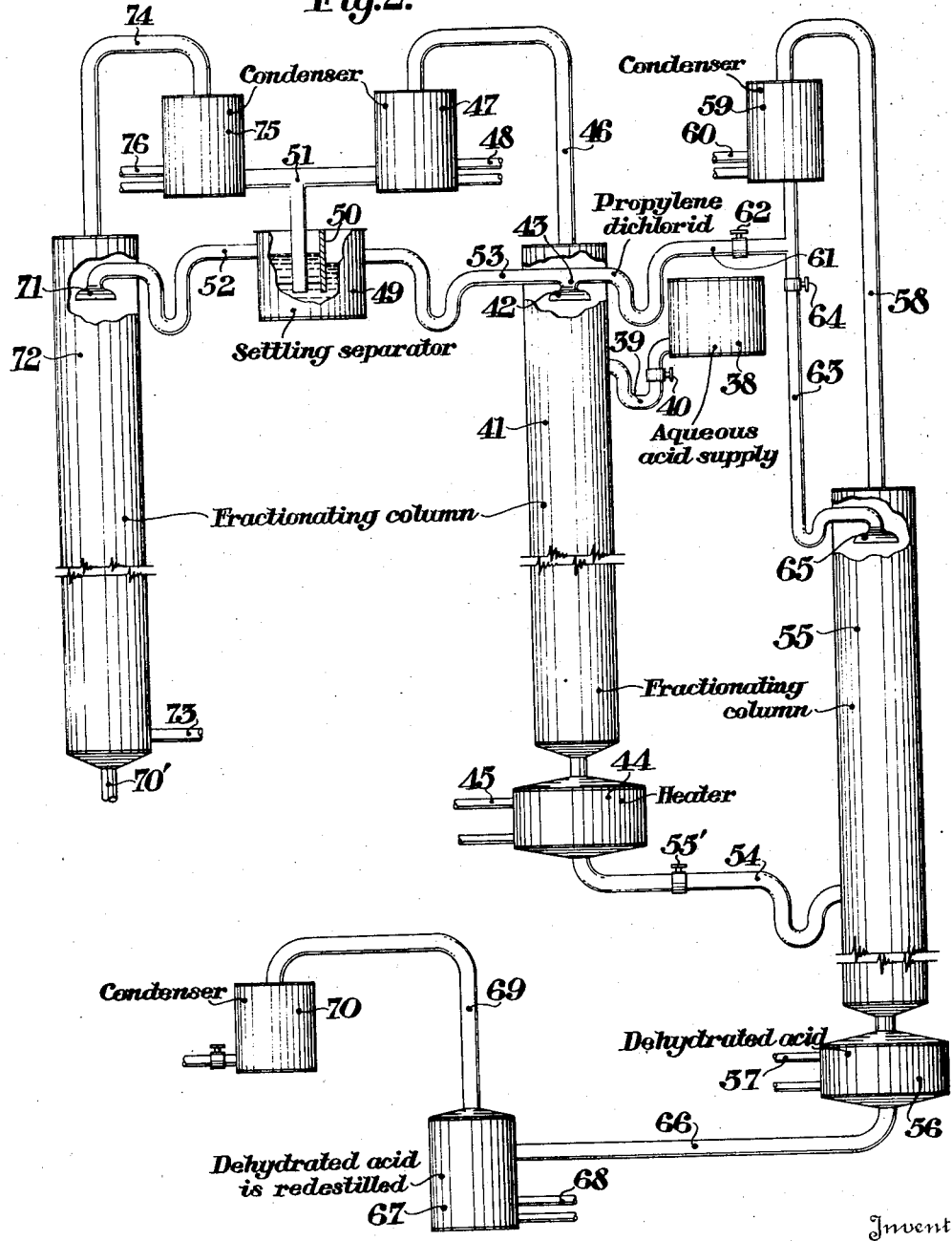

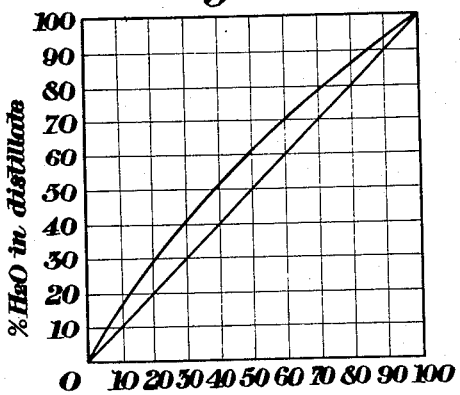
Fig.3. Plain Distillation of Aqueous Acetic Acid.
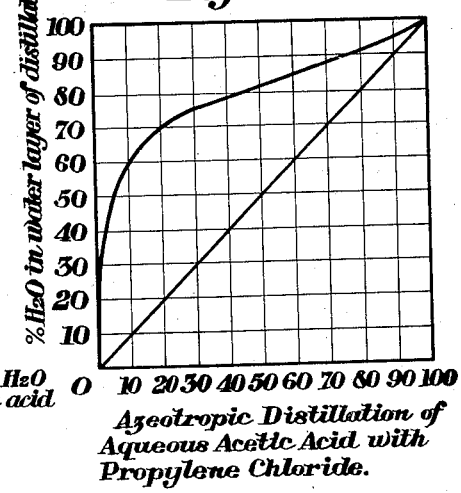
Fig.4. Azeotropic Distillation of Aqueous Acetic Acid with Propylene Chloride.
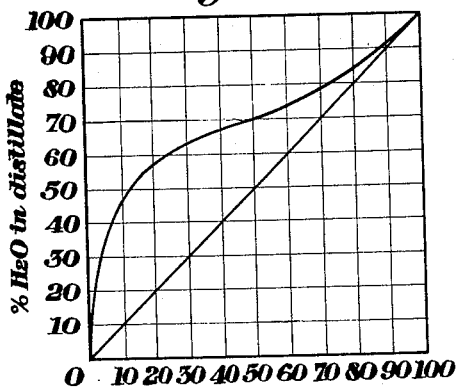
Fig.5. Plain Distillation of Aqueous Propionic Acid.
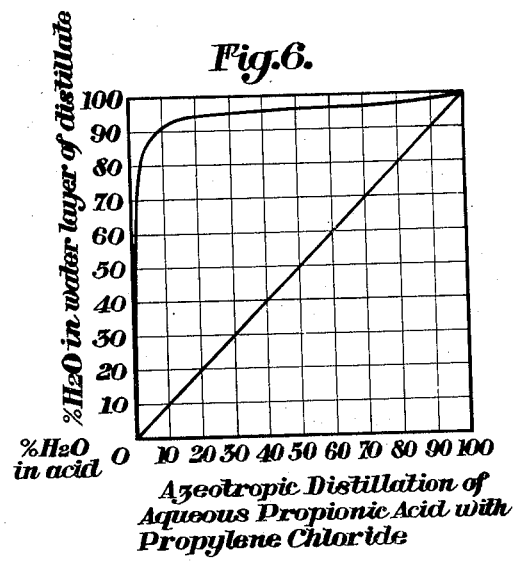
Fig.6. Azeotropic Distillation of Aqueous Propionic Acid with Propylene Chloride Patented May 9, 1933

UNITED STATES PATENT OFFICE

WILLIAM WEAVER HARTMAN, OF ROCHESTER, NEW YORK, ASSIGNOR TO EASTMAN KODAK COMPANY, OF ROCHESTER, NEW YORK, A CORPORATION OF NEW YORK

PROCESS OF DEHYDRATING AQUEOUS ALIPHATIC ACIDS AND MIXTURES THEREOF

Application filed July 13, 1931. Serial No. 550,397.

This invention relates to processes of removing water from aqueous aliphatic acids and more particularly to processes for the dehydration of dilute solutions of acetic, propionic and other aliphatic acids or mixtures thereof.

This application is in part a continuation of my application Serial No. 524,063, filed March 20, 1931.

The removal of water wholly or partially from aqueous aliphatic acids or mixtures thereof is a problem of great technical importance. For example, certain chemical processes, such as the manufacture of cellulose acetate or propionate, require large quantities of highly concentrated or anhydrous acids and after such processes are completed there is often left a large amount of dilute acid from which the water must be removed before the acid can be reemployed. It is obvious that to lessen the expense of such removal is highly desirable. Furthermore, in the initial stages of the production of these acids they are too diluted with water for most manufacturing processes. Taking the manufacture of acetic acid by the destructive distillation of wood as an example, there is initially produced a dilute aqueous solution or mixture of acetic, propionic and other aliphatic acids together with various impurities, which is called pyroligneous liquor. After separating out most of the impurities, the solution must be concentrated and it is therefore highly desirable that this be accomplished by a process which is simple and more inexpensive than those used heretofore.

Likewise, when the acids above referred to are produced by the action of microorganisms, they are formed in dilute aqueous solutions which must be concentrated and in this case it is equally desirable that the water be removed as simply and as cheaply as possible. Various processes for the concentration or dehydration of aliphatic acids have been devised, some of which operate upon the principle of separation of the components mixed with the acid by rectification of distilled vapors, while others operate upon the principle of employing a liquid with the aqueous acid which forms a constant boiling mixture with the water whereby it is entrained and carried away by vaporization. However, until the invention described in U. S. Patent 1,804,745 to Clarke and Othmer, no process had been devised which would efficiently and substantially completely concentrate dilute aqueous solutions of acids of the general character under consideration without additional distillation operations being performed upon the azeotropic distillate.

This invention has as an object to provide a process of removing water from dilute solutions of acetic, propionic and other aliphatic acids or mixtures thereof. A further object is to provide such a process which will be simple, inexpensive and yet applicable to solutions of any strength. A still further object is to provide a process which is applicable, not only to relatively pure water solutions of acetic, propionic and other acids, but also to the production of concentrated acids from crude aqueous solutions, such as pyroligneous liquor obtained from wood distillation. It is also an object to provide a process for the concentration of aqueous solutions of acetic acid which contain in addition varying proportions of propionic acid and other higher aliphatic acids. Another object is to provide a process in which the water which is finally removed carries away only a very small or negligible amount of acid with it. Still another object is to provide such a process in which the amount of heat required is kept as low as possible. It is also an object to provide a process in which distillation is the main factor thereby eliminating the trouble and cost of initial extraction steps. Other objects will appear hereinafter.

These objects are accomplished by the following invention which comprises a distillation process for removing water from aqueous aliphatic acids in which a particular water entraining organic liquid is employed. I have found that highly desirable results may be obtained by mixing the aqueous acid or acid mixture with propylene chloride and distilling water and propylene chloride from the mixture at a temperature below the boiling point of the acid or acids in question and also below the boiling point of water. It is to be noted that my invention is not an extraction process and is distinguished from such processes by the fact that neither the acid nor the water in the impure aqueous mixture is extracted or dissolved to any appreciable extent by the organic water entraining liquid which is added to the distillation mixture, but on the contrary the liquid forms an azeotropic mixture with the water present, which mixture separates upon condensation into two distinct layers, one of water and the other of entraining liquid. My invention is further distinguished by the fact that the removal of water from the acid takes place at a relatively low temperature and does not require extensive treatment of the distillate for recovery of the water entraining medium, as is generally the case when using high boiling extracting media.

In my application Serial No. 524,063 of which the present application is a continuation in part, there is disclosed a method for the dehydration of acetic acid by azeotropic distillation with propylene chloride. I have now discovered after expensive research that azeotropic distillation with propylene chloride may be effectively applied, not only to the concentration of acetic acid, but also to the dehydration of propionic and butyric acids, either from their pure water solutions or mixtures thereof, or from impure aqueous mixtures, such as those obtained in the destructive distillation of wood.

My process may be carried out in a fractionating column of known type, the distilled water and propylene chloride being condensed, allowed to settle into two layers, the propylene chloride which forms the lower layer being returned to the upper part of the column for reuse. In the preferred embodiment of my process the propylene chloride passes through a cycle without serious loss and can be used over and over in a continuous manner.

For a discussion of the requisites of an organic auxiliary liquid for use in the purification of an acid by azeotropic distillation, reference is made to U. S. Patent 1,804,745 to Clarke and Othmer. I have found that propylene chloride possesses all of the required properties therein described, not only when used in the purification of acetic acid, but also purification of higher aliphatic acids such as propionic and butyric. This compound is a colorless liquid having the structural formula:

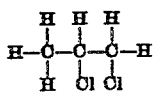

It is a saturated compound and may be regarded as dichlor-propane. It has a boiling point of 96.8° C. and is practically immiscible with water, the water dissolving only about .27% of it at 20° C. It forms with water an azeotropic mixture which boils at about 78° C. and 760 mm. pressure, the mixture consisting of about 88% propylene chloride and 12% water, by volume, corresponding to a ratio of about 7⅓ parts of propylene chloride by volume to one of water, or 8.3 parts by weight. It will, therefore, be seen that every 7⅓ parts by volume of propylene chloride which is distilled from the aqueous mixture will carry over approximately one part of water. As substantially none of the acetic, propionic or other acid under going treatment enters into the azeotropic mixture which is formed, the desired acid is left behind in the column or other distillation vessel in a dehydrated condition.

If a distillation column is employed as the dehydrating apparatus, the acid gradually becomes more concentrated as it descends in the column, since it has the highest boiling point of any of the components undergoing distillation. The water and propylene chloride are driven off from the acid as it descends and the propylene chloride as it passes upward through the column in successive stages carries with it more and more water until there is distilled off from the top plate of the column the azeotropic mixture of water and propylene chloride above referred to. It is to be noted as one of the particular advantages of my invention that any given unit of propylene chloride will carry away with it, as an azeotropic mixture, more water than an equal unit of any of the withdrawing agents previously suggested in the art for use in dehydrating aqueous acetic or other aliphatic acids. It will be apparent that, inasmuch as substantially complete dehydration is the object of the process, at least a slight excess of propylene chloride over that required to form an azeotropic mixture with the water present at any given point should be kept at all points in the system at which distillation takes place or at least at the point where the last vaporization of the azeotropic mixture occurs.

When using a fractionating column, there is substantially no acid, less than 0.5% in the watery layer of the distillate in the case of acetic acid and less than .2% in the case of propionic acid, and less than .5% acid with a mixture of these acids. Since distillation will not concentrate aqueous acid weaker than the watery layer of the distillate and, since my process when carried out in proper apparatus causes virtually no acid to exist in such layer, the process will therefore concentrate aqueous acetic or propionic acids, for example, of any strength from less than 1% to over 99%.

By varying the length of the fractionating column to give a more efficient rectification, there will be present in the watery layer of the distillate an even less amount of acid. The per cent of acid in this watery layer will vary as the concentration of the acid in the still pot varies, although in a continuous operation there will be practically 100% acid in the still pot and there will, of course, be a constant amount of acid in the watery layer of the distillate. It will, of course, be apparent that when concentrating a mixture of acids, say, for example, acetic and propionic, there will be present in the watery layer of the distillate minute amounts of both acetic and propionic acids.

Several types of distillation apparatus may be used in carrying out my invention in practice. For example, I may use any of the forms of apparatus disclosed in U. S. Patent 1,804,745, but I prefer to use the apparatus disclosed in the drawings forming a part of the present application and to use a unitary and continuous process as distinguished from a process in which it is necessary to perform separate and distinct operations on various portions of the acid mixture undergoing concentration.

In the accompanying drawings in which like reference characters refer to like parts,—

Fig. 1 is a semi-diagrammatic side elevation of one form of apparatus in which my process may be carried out, certain of the parts being exaggerated and portions of others broken away for clarity.

Fig. 2 is a similar view of another form of apparatus which may be used to carry out my invention.

Figs. 3, 4, 5 and 6 are charts showing the comparative effectiveness of water removal from various aqueous aliphatic acids by plain distillation as compared to azeotropic distillation with propylene chloride.

In Fig. 1 the numeral 1 represents a distillation column of well known construction, such as a column provided with a series of plates with bubble cap construction so that the vapors rising in the column are caused to pass through the liquid which is collected upon each plate. A portion of the column is broken away to show the construction of the plates in diagrammatic form. For carrying out my process, I have found a column still of approximately 40-plate construction to be suitable. At the bottom of the column is provided a still pot 2 of the usual construction, such as that heated by steam pipes or other well-known means. This still pot is connected with the column by a pipe 3 for the purpose of conducting vapors rising from the still pot into the column 1. A suitable draw-off pipe 4 equipped with a valve is provided for the still pot 2 by means of which substantially pure acid may be withdrawn from the still pot as hereinafter further discussed.

At a point approximately two thirds of the way up the column or, in other words, at a position corresponding approximately to plate 25, is provided a valved inlet pipe 5 for the introduction into the column of aqueous acid from the acid supply tank 6, mounted preferably above the inlet pipe in order that the acid will flow into the column by means of gravity. In the top portion of the column 1 and at a point above the uppermost plate in the column is provided a propylene chloride inlet 7. Two valved propylene chloride supply pipes, 8 and 9, connected with the inlet 7 are provided for the introduction of propylene chloride into the top of the column. The supply pipe 9 is connected with a propylene chloride supply tank 10 for a purpose hereinafter described. The function of the supply line 8 will also be more fully discussed.

At the head of the column 1 is provided a vapor outlet pipe 12 which is connected with the condenser 13 which may be cooled by any suitable medium such as water entering and leaving by the pipes 21 and 22, respectively. Any condensate accumulating in the condenser 13 is conducted by means of a pipe 14 into the separator 15, which separator is provided with a baffle plate 16 extending to within a short distance of the bottom of the separator. The pipe 17 carries away water which separates out in the separator and the pipe 8 conducts propylene chloride which also separates out in the separator back to the head of the column for re-use therein. At a point approximately one-third of the way up the column 1, or at a position approximately opposite plate number 14 of the column, is provided a vapor inlet 18 which connects the supplemental still pot 19 with the column 1. A valved pipe line 20 is provided to conduct aqueous acid from the acid supply tank 6 to the supplemental still pot 19. The still pot 19 may be of construction similar to the still 2 and may also be provided with an outlet for withdrawing therefrom such residual impurities as may collect therein. It will be obvious that the construction above described is merely diagrammatical and that the elements described are all well known to those skilled in this art and may be of such suitable construction as would be employed by any distillation engineer.

Assuming the plant to be newly constructed, it is necessary, in order to place it in operation that the still pot 2 be charged with the highly concentrated acid, such, for example, as glacial acetic acid in the case of concentrating dilute solutions of acetic acid, and that a supply of the dilute acid undergoing concentration and propylene chloride be contained in the tanks 6 and 10, respectively. Through the pipe 5, the aqueous acid is introduced slowly into the column 1 and heat applied to the still pot 2. It may be stated at this point that in the case of concentrating acetic or propionic acids or their impurities, an acid analyzing anywhere from 1% to 99% or more may be profitably and successfully concentrated by my process to as strong as 99.8% or more purity. At the same time a supply of propylene chloride is introduced into the column 1 through the pipe 9. Upon starting the process, therefore, the plates of the lower two-thirds of the column will contain aqueous acid and the plates of the upper third of the column will contain propylene chloride. This condition exists, however, only at the start of the process as the process soon comes to equilibrium and operates in a continuous manner.

Assuming that the process is to be operated continuously, the various operations are carried out as follows: Upon the top plate of the column there exists a constant boiling mixture of propylene chloride and water, it being necessary to maintain only upon the upper plate of the column a slight excess of propylene chloride. This constant boiling mixture of propylene chloride and water is vaporized by the heat supplied to the column from the still pot 2 and the vapor mixture of water and propylene chloride passes over through the pipe 12 into the condenser 13 wherein the vapor condenses into a liquid mixture of propylene chloride and water which then passes through the pipe 14 into the separator 15.

In this separator the propylene chloride, being the heavier of the two liquids, settles to the bottom and passes on to the baffle 16 into the right-hand section of the separator, and is continuously drawn off therefrom by means of the pipe 17 leading to the sewer. The pipe 8 controlled by a valve returns the propylene chloride to the head of the column where by means of the inlet 7 it is re-introduced into the system. The process being in continuous operation, it is necessary to introduce very little propylene chloride from the supply tank 10, inasmuch as it is used only to supply the small amount of propylene chloride which may be lost in the system, such as through slight leakage or through being carried off by slight occlusion or solution in the water drawn off from the separator by the pipe 17.

Assuming that the process is being operated without the assistance of the supplemental pot 19, aqueous acid is continuously introduced through the pipe 5 at a rate equivalent to the capacity of the column still 1 for dehydrating the aqueous acid. From the point where the acid is introduced into the column, if we proceed downwardly plate by plate, it will be found that the percentage of water in the aqueous acid decreases. If we proceed upwardly from the point at which the pipe 5 enters the column still, we will find that the percentage of the desired acid contained in the mixture upon each plate will decrease until on the top plate substantially no acid exists in the mixture. Also as we proceed upwardly in the upper plates of the column we will find that the percentage of water in the propylene chloride mixture increases.

The converse of this is, of course, that as we proceed downwardly from the uppermost plate of the column, the ratio of water to propylene chloride very markedly decreases until at the lower plates of the column nothing but propylene chloride and concentrated acid exists upon these plates. Also as we proceed downwardly through the lower plates of the column, we will find that the ratio of propylene chloride to acid decreases until at the lowermost plate of the column it will be found that substantially pure concentrated acid exists. It will, therefore, be observed that this lower portion of the column 1 is made to perform the same function as the additional or supplemental column required in most processes of this general type. The substantially pure concentrated acid refluxes into the still pot 2 where the excess accumulating is drawn off through the pipe 4 and conducted to storage or such use as may be intended.

If, instead of introducing the aqueous acid in liquid form by means of the pipe 5, it be desired to employ the supplemental still pot 19, we may assume that the pipe line 5 is entirely shut off and the aqueous acid is conducted directly to the still pot 19. In the still pot 19 the aqueous acid is vaporized and the mixed vapors of water and acid are conducted by means of the pipe 18 into the column 1 at a point approximately one-third the way up the column. These acid and water vapors then travel up the column and meet the downwardly progressing stream or supply of propylene chloride. The water combining with the propylene chloride forms a constant boiling mixture which distills off and passes in a vaporous state onto the next higher plate and so on up the column; the acid not vaporizing passes down the column so that the cycle occurring when the supplemental still pot 19 is utilized is the same in principle as when the aqueous acid is introduced into the column through the pipe 5 in liquid form, the difference being merely in the detail that the composition of the mixture upon each plate will vary slightly due to the fact that the water in liquid or vapor form, respectively, is introduced at a different position in the column. The pipe 18 may, of course, be provided with a suitable check valve in the event it may be desired to change from one mode of operation to the other at different times. As will be understood by those skilled in the art, the exact point in the column at which the liquid or vaporous aqueous acid is introduced is best determined by practice. It is sufficient to state that the attempt should be made to introduce the material to be hydrated at a point where the composition of the mixture in the column has substantially the same water content as that being introduced.

It is also possible to simultaneously introduce the aqueous acid in vapor form through the line 18 and in liquid form through the line 5 and operate the process in that manner. In any event, if operating the process by any of the methods indicated it is necessary merely that the operator control the input of the various materials into the column in such a way that substantially pure concentrated acid issues from the bottom of the column and that a constant boiling mixture of propylene chloride and water exists upon the top plate of the column.

Fig. 2 shows diagrammatically a somewhat different form of apparatus for carrying out my invention which employs a plurality of shorter distillation columns in place of the single high column of Fig. 1. The supply tank of aqueous acid 38 is connected by pipe 39, controlled by valve 40 with an intermediate portion (say about two-thirds of the way up) of a fractionating column 41 of one of the usual types, preferably though not necessarily forty plates high. At the top of this column a downward current or spray of propylene chloride enters from nozzle or opening 42, which is connected with the horizontal transverse pipe 43. The base of the column is provided with the customary heating vessel 44, the heating fluid for which comes through pipes 45.

The azeotropic mixture of the vapors of water and propylene chloride leaves the top of the column passing around pipe 43 into pipe 46 and from thence enters condenser 47, the cooling fluid of which circulates through pipes 48. The distillate from 47 flows down into settling chamber 49, the latter being provided with a downwardly extending transverse partition 50, which is separated, however, from the bottom of the vessel. The pipe 51 from the condenser 47 likewise extends well down into the vessel 49. When the distillate reaches vessel 49, it separates into two layers, the water layer being uppermost and confined at one side of the partion 50, as shown in the drawings. From the vessel 49 the water layer passes through exit pipe 52 to further treating apparatus which will be described hereinafter. The lower layer of propylene chloride passes beneath the partition 50 and out through pipe 53 to pipe 43 and thence downwardly through the nozzle 42 into the fractionating column 41. Thus the bulk of the propylene chloride passes through a cycle from nozzle 42 to column 41 and thence through the following parts,—46, 47, 51, 49, 53 and 43.

There is, of course, an excess of propylene chloride maintained at the various distillation points in the system, as previously described, namely, more than about 8⅓ parts by weight of propylene chloride for each part by weight of water to be eliminated. This means that some propylene chloride will collect with the dehydrated or concentrated acid in the heating vessel 44 unless a high and well regulated column is employed as in Fig. 1. This dehydrated mixture is then conducted through pipe 54 controlled by valve 55' to an intermediate portion of an auxiliary fractionating column 55 of one of the known types.

The heating of this column 55 is done in the chamber 56, the heating fluid for which circulates through pipes 57. Vapors of propylene chloride pass from the top of the column through pipe 58 to condenser 59, the cooling fluid of which circulates through pipes 60. This condensed propylene chloride can be passed partly through pipe 61 controlled by valve 62 into pipe 43 and nozzle 42 of the main fractionating column, and partly through pipe 63 controlled by valve 64 into the nozzle or opening 65 at the top of column 55, there to act as refluxing liquid.

The concentrated acid in vessel 56 is conducted through pipe 66 to a simple still 67, the heating fluid for which circulates through pipes 68. The vapors of aqueous acid pass over through pipes 69 into the final condenser 70 from which the concentrated acid can be drawn off and stored. The distillation in still 67 is not indispensable, but is preferable to remove some small amounts of coloring or polymerized bodies that may be formed during the other operations.

Referring to the upper left-hand part of Fig. 2, the watery layer from the settling vessel 49 passes through pipe 52 to the nozzle or opening 71 at the top of fractionating column 72, the latter being of any of the usual types. Steam is blown into the column through pipe 73 and hot water passes to waste through pipe 70', preferably to a heat interchanger, not shown. The passage of the steam up the column 72 flashes off the small amount of propylene chloride which is present in the watery material descending from nozzle 71. The vapors of propylene chloride and water pass through pipe 74 into condenser 75, the cooling fluid of which circulates through pipes 76. The propylene chloride from 75 passes through pipe 51 to the bottom or lower layer of the settling vessel 49 and thence returns through the normal circulatory path of the propylene chloride through pipes 53 and 43 and nozzle 42.

From the foregoing it will be apparent that my invention may be carried out in many forms of apparatus, of which Figs. 1 and 2 are illustrative. In fact, the invention may be carried out with an ordinary balloon distillation flask and a condenser as a batch operation although that would not be economical on a commercial scale and does not result in the most efficient dehydration of the aqueous acid. Although there is shown in Fig. 1 a single distillation column, it is to be understood that in the interest of economy of space or for other considerations, it may be desirable to construct it in two or more sections placed one above or alongside of the other or in staggered relation. Other forms of apparatus and methods of carrying out the invention may be employed without departing from the spirit and scope thereof.

It will be understood that in all forms of apparatus the customary precautions for preventing heat losses by suitable insulation are observed, and the parts which contact with the acid are made of resistant materials customarily employed for that purpose. Furthermore, the process is preferably operated under atmospheric pressure conditions, although it can be conducted with the system at superatmospheric pressure or subatmospheric. When I refer herein to the boiling points of the ingredients and mixtures such, for instance, as the boiling point of water, I refer to the boiling points under the particular pressure conditions that are employed, normally atmospheric.

The greatly improved results to be obtained by the use of my invention are graphically illustrated in Figs. 3, 4, 5 and 6. It will be seen from these charts that azeotropic distillation with propylene chloride is especially effective in the dehydration of acetic, propionic, and other aliphatic acids.

Fig. 3 shows the results obtained by simple distillation of aqueous acetic acid without the use of a water entraining liquid, the curve being obtained by plotting the percentage of water in the distillate against the percentage of water in the liquid in the still pot. Since the curve lies only very slightly above the 45° line representing the same amount of water in the distillate and the liquid undergoing distillation, respectively, it will be apparent that no matter what the strength of aqueous acid is, the percentage of water in the distillate obtained is only slightly greater, and it is, therefore, uneconomical to concentrate aqueous acid by plain distillation.

Fig. 4 shows the curve plotted under corresponding conditions using propylene chloride as the water entraining liquid in the dehydration of aqueous acetic acid, i. e., the abscissa represents the percentage of water in the aqueous acetic acid undergoing distillation in the presence of an amount of propylene chloride equal in weight to that of the aqueous acetic acid. It will be noted in this case that the curve lies substantially above the 45° line and clearly indicates the marked advantages to be obtained by azeotropic distillation with this particular water entraining liquid.

Fig. 5 shows the same type of curve as that of Fig. 3 for the plain distillation of aqueous propionic acid. Here again it will be apparent that no matter what the strength of the aqueous propionic acid is, the percentage of water in the distillate obtained is only slightly greater than that of the liquid undergoing distillation, and that, in this case also, it will not be economical to concentrate the aqueous acid by plain distillation.

Fig. 6, on the other hand, shows graphically the very marked advantage of the application of azeotropic distillation of acqueous propionic acid employing propylene chloride as the water entraining liquid, the conditions being the same as those under which the curve of Fig. 4 was obtained. The curve in this case lies very markedly above the 45° line showing a highly efficient separation of water from the aqueous liquid.

The above results show conclusively that propylene chloride is highly effective in the azeotropic dehydration of aliphatic acids, including acetic, propionic and others. I have found, for example, that the process herein described is especially effective in the dehydration of an aqueous acetic acid containing in addition varying amounts of propionic acid and in some cases even other higher aliphatic acids, as would be the case of the crude acid mixture known as pyroligneous liquor. I have found that this feature of the invention is of particular value in concentrating aqueous acid solutions such as those produced in the manufacture of mixed organic esters of cellulose, such as cellulose acetate propionate.

What I claim as my invention, and desire to be secured by Letters Patent of the United States is:

1. The process of dehydrating an aqueous monobasic aliphatic acid of 2–4 carbon atoms which comprises mixing propylene chloride therewith and distilling water and propylene chloride from the mixture.

2. The process of dehydrating an aqueous monobasic aliphatic acid of 2–4 carbon atoms which comprises mixing propylene chloride therewith and distilling therefrom a constant boiling mixture of propylene chloride and water at a temperature below the boiling point of water.

3. The process of dehydrating an aqueous monobasic aliphatic acid of 2-4 carbon atoms which comprises mixing propylene chloride therewith, distilling a constant boiling mixture of propylene chloride and water from the aqueous mixture, condensing the distillate, allowing it to settle into two layers, and returning the lower propylene chloride layer to the mixture undergoing distillation.

4. The process of dehydrating an aqueous monobasic aliphatic acid of 2-4 carbon atoms which comprises mixing therewith approximately 8⅓ parts by weight of propylene chloride for every part by weight of water to be removed from the aqueous acid, distilling therefrom a constant boiling mixture of propylene chloride and water, condensing the distillate, allowing it to settle into two layers and returning the lower propylene chloride layer to the mixture undergoing distillation.

5. The process of dehydrating an aqueous monobasic aliphatic acid of 2-4 carbon atoms which comprises mixing therewith approximately 8⅓ times as much propylene chloride by weight as there is water present in the aqueous acid, distilling therefrom a constant boiling mixture of propylene chloride and water, condensing the distillate, allowing it to settle into two layers, returning the lower propylene chloride layer to the mixture undergoing distillation, and removing the dehydrated acid from the latter mixture.

6. The process of dehydrating an aqueous monobasic aliphatic acid of 2-4 carbon atoms, which comprises mixing therewith slightly more than 8⅓ parts by weight of propylene chloride for every part by weight of water to be removed from the aqueous acid, distilling the mixture and removing therefrom in vapor form and at a temperature below the boiling point of water a constant boiling mixture of propylene chloride and water, condensing the distillate, allowing it to settle into two layers, returning the lower layer to the distillation mixture and continuously removing the dehydrated acid from said distillation mixture.

7. The process of dehydrating propionic acid which comprises mixing propylene chloride therewith and distilling water and propylene chloride from the mixture.

8. The process of dehydrating propionic acid which comprises mixing propylene chloride therewith and distilling therefrom a constant boiling mixture of propylene chloride and water at a temperature below the boiling point of water.

9. The process of dehydrating propionic acid which comprises mixing propylene chloride therewith, distilling a constant boiling mixture of propylene chloride and water from the aqueous mixture, condensing the distillate, allowing it to settle into two layers, and returning the lower propylene chloride layer to the mixture undergoing distillation.

10. The process of dehydrating propionic acid which comprises mixing therewith approximately 8⅓ parts by weight of propylene chloride for every part by weight of water to be removed from the aqueous acid, distilling therefrom a constant boiling mixture of propylene chloride and water, condensing the distillate, allowing it to settle into two layers and returning the lower propylene chloride layer to the mixture undergoing distillation.

11. The process of dehydrating propionic acid which comprises mixing therewith approximately 8⅓ times as much propylene chloride by weight as there is water present in the aqueous acid, distilling therefrom a constant boiling mixture of propylene chloride and water, condensing the distillate, allowing it to settle into two layers, returning the lower propylene chloride layer to the mixture undergoing distillation, and removing the dehydrated acid from the latter mixture.

12. The process of dehydrating propionic acid which comprises mixing therewith slightly more than 8⅓ parts by weight of propylene chloride for every part by weight of water to be removed from the aqueous acid, distilling the mixture and removing therefrom in vapor form and at a temperature below the boiling point of water a constant boiling mixture of propylene chloride and water, condensing the distillate and allowing it to settle into two layers, returning the lower layer to the distillation mixture and continuously removing the dehydrated acid from said distillation mixture.

13. The process of dehydrating an aqueous mixture of acetic, propionic and other aliphatic monobasic acids of 2-4 carbon atoms which comprises mixing propylene chloride therewith and distilling therefrom a constant boiling mixture of propylene chloride and water.

14. The process of claim 13 which includes the additional steps of condensing the distillate, separating it into two layers and returning the lower propylene chloride layer to the mixture undergoing distillation.

Signed at Rochester, New York this 7th day of July, 1931.

WILLIAM WEAVER HARTMAN.